Jan. 30, 1951 — C. A. ABLETT — 2,539,683
ROLLER THRUST BEARING
Filed Nov. 5, 1946 — 2 Sheets-Sheet 1

INVENTOR
Charles Antony Ablett
BY Cameron, Kerkam, & Sutton
ATTORNEYS

Jan. 30, 1951　　　C. A. ABLETT　　　2,539,683
ROLLER THRUST BEARING

Filed Nov. 5, 1946　　　2 Sheets-Sheet 2

INVENTOR
Charles Antony Ablett
BY
Cameron, Kerkam, & Sutton
ATTORNEYS

Patented Jan. 30, 1951

2,539,683

UNITED STATES PATENT OFFICE 2,539,683

ROLLER THRUST BEARING

Charles Antony Ablett, Norfolk, England

Application November 5, 1946, Serial No. 707,913
In Great Britain July 5, 1944

Section 1, Public Law 690, August 8, 1946
Patent expires July 5, 1964

4 Claims. (Cl. 308—234)

The present invention relates to roller thrust bearings of the kind embodying a roller bearing cage which carries a plurality of radially disposed relatively short thrust rollers, and has for its primary object to provide an improved form of roller thrust bearing for use as a thrust bearing block, for example, as a thrust bearing block for propeller shafts such as are employed in marine propulsion.

A further object of the invention is to enable such a thrust bearing when used as a thrust bearing block to accommodate itself to any deflection of the thrust-imparting or thrust-taking surfaces that may occur under load conditions.

Accordingly, the present invention provides a roller bearing thrust block wherein a roller bearing cage, having mounted thereon or therein a plurality of radially disposed relatively short thrust rollers, is interposed between a thrust imparting surface carried by a rotatable shaft or equivalent member and the surface of an abutment which is adapted to take the thrust, the one surface being supported adjacent its centre with its outer edge left free and the other surface being supported adjacent its outer edge whilst the centre part thereof is left free, so that flexure of the said surface produced by axial thrust thereon will be substantially equal and in the same direction.

It will be appreciated that under load conditions there is a tendency for the opposed thrust-imparting and thrust-taking surfaces to flex or otherwise become distorted or displaced out of their true radial planes with the result that the gap between such surfaces may become displaced laterally or become divergent towards the outer peripheral edge of the roller bearing cage. In this connection it will also be understood that the manner in which each individual thrust surface is distorted will depend upon the manner in which it is axially supported. If it is supported near its centre with its peripheral edge left free it will probably flex so that it becomes convex in relation to the opposed thrust surface. On the other hand, if the thrust surface is supported at or adjacent its outer peripheral edge with its centre portion left free it is likely to flex so that it becomes concave in relation to the opposed thrust surface. Thus, by the arrangement according to the invention the distortion of the thrust-imparting or thrust-taking surface can be expected to follow the distortion of the opposed surface with the result that while the gap may be caused to assume a curved form and may become displaced axially, a relative divergent displacement of the thrust surfaces will be avoided and the gap will remain of even width throughout its length. Under such conditions, the transverse width of the gap may remain constant or may increase slightly or may decrease slightly. Accordingly, and in order to take care of this factor, the relatively short rollers or the thrust surfaces on which they engage may be so arranged and formed as to enable the load to be distributed evenly and not unduly to load any one part of the thrust bearing. This may be accomplished in a number of ways. For example, according to one arrangement, the relatively short thrust-taking rollers are formed so that those farthest from the shaft are slightly greater in diameter than those nearest to the shaft and so that the intermediate rollers progressively (radially outward from the shaft) increase in diameter to such an extent as will cause or enable the rollers and the thrust surfaces to engage with each other to secure an even distribution of the load under load conditions. According to another arrangement, the annular portions of the thrust surfaces which are engaged by the relatively short thrust-taking rollers may be stepped back from one another or staggered radially outward from the axis of the shaft with similar effect, it being appreciated that in either arrangement the staggering or the diameter variations should be such as will conform with the curve of deflection produced or expected in the thrust surfaces under load conditions and will enable a proper distribution of the load to be effected. If desired, the aforesaid annular portions may be formed as ring-like elements or races which are separate from the members which bear the thrust surfaces and are seated in annular grooves formed therein, the bottoms of the grooves and the bottoms of the elements being curved or otherwise mutually formed to permit flexing and the maintenance of the bearing surfaces in full contact with the surfaces of the rollers.

It is to be understood that the cage member or the annular or ring-like parts constituting the same and the races are preferably split or made in two or more sections and suitable means are provided for retaining or maintaining the individual thrust-taking rollers in their correct positions.

In order that the said invention may be clearly understood and readily carried into effect, the same will now be more fully described with reference to the accompanying drawings in which.

In the accompanying drawings, $a$ indicates a rotary shaft upon which is secured a flanged member $b$ forming the thrust-imparting abutment of the thrust block and provided with a bearing sleeve or collar $b'$ which firmly backs and supports the centre portion of the thrust-imparting surface of the member whilst leaving the outer peripheral flange portion thereof unbacked and comparatively free to flex.

$c$ indicates a hollow cylindrical member the diametrical wall $c'$ of which forms the thrust-taking fixed abutment of the bearing device. The member $c$ is supported by a fixed bracket $l$ in co-axial relation to the shaft $a$ so that in effect the thrust-taking surface is firmly backed and supported in the area around its peripheral edge whilst its centre area is left unbacked and comparatively free to flex. Between the two abutments $b$ and $c'$ there is arranged a cage carrying a plurality of separate, spaced, relatively short, thrust-taking rollers $d$. In the preferred form of the invention, the aforesaid cage is made up of a plurality of separate, concentric, annular or ring-like parts each having mounted therein one or more sets of radially-disposed, short, thrust-taking rollers. For example, there may be provided three split or divided annular or ring-like parts such as are shown at $e$, $f$ and $g$, the arrangement being such that a roller bearing having a series of rollers $h$ with their axes arranged parallel with the shaft is disposed between the shaft and the inner annular or ring-like part $e$ in order to support the weight of the cage and so that the cage cannot rub on the shaft. Each annular or ring-like part is provided with a set of radially disposed, short, thrust-taking rollers and along each radial line there may be one or two or more rollers, journalled in suitable radial slots or openings provided for the purpose. The rollers may be parallel or tapered and around the outer annular or ring-like part $g$, there is arranged suitable means such as a split locking ring $k$ for preventing the cage elements from separating or flying apart under the influence of the centrifugal forces developed, said means or locking ring being suitably secured to the outermost cage element or annular ring.

The rotary and fixed abutments or flanges are preferably each provided with a plurality of removable or replaceable thrust-taking rollers or races such as are shown at $m$, there being a separate ring or race $m$ for each set of thrust-taking rollers $d$. Such rings may be let into annular grooves formed in the fixed and rotary abutments and, if desired, the rings and the grooves may be mutually formed to permit slight flexure as already stated.

Figure 1:
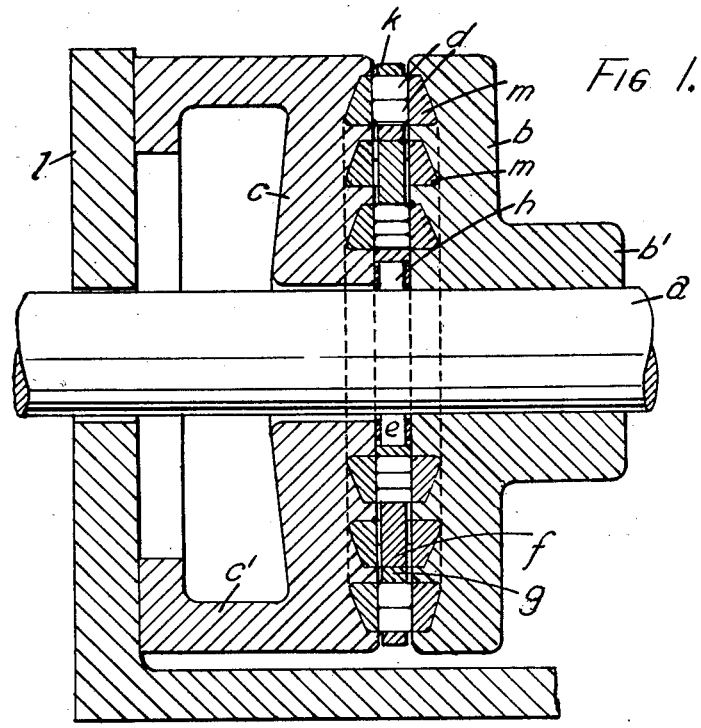
Fig. 1 shows diagrammatically and in section one mode of carrying the invention into effect.
Figure 2:
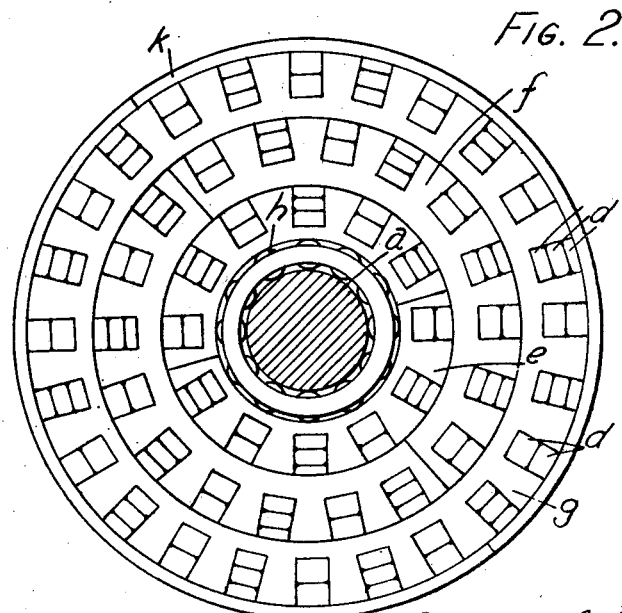
Fig. 2 is a detail view of one form of split cage or series of concentric cages that may be employed to carry the short-thrust rollers.
Figure 3:
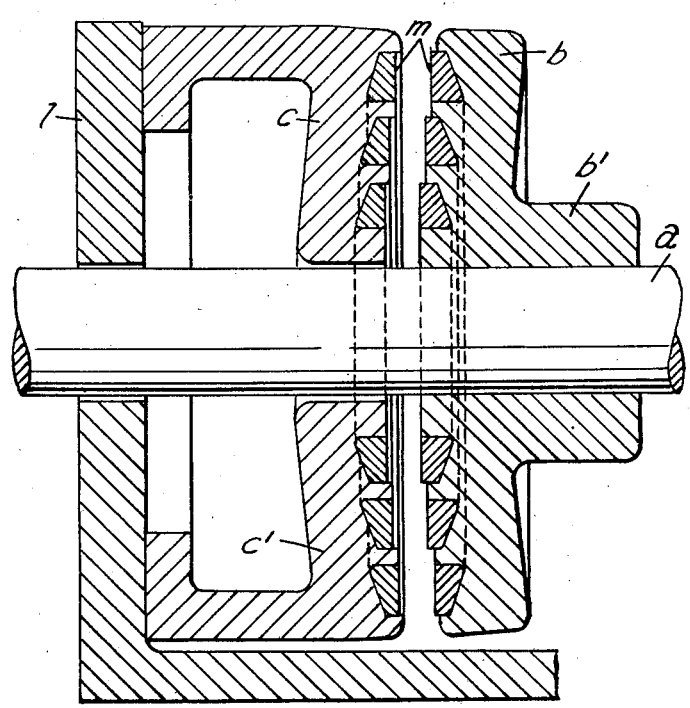
Fig. 3 is a diagrammatic view illustrating to an exaggerated degree one manner in which distortion may take place.

As previously explained above, by the arrangement now described any flexure or distortion of the thrust-imparting and thrust-taking surfaces will be likely to take place as shown in Fig. 3 so that the gap therebetween will remain substantially even in width throughout its length. The construction and arrangement of the short, radially disposed and axially aligned thrust rollers will facilitate the independent axial displacement of these members to accommodate themselves to the axial displacement of the thrust elements or races with which the rollers are associated.

I claim:

1. A roller thrust bearing comprising in combination a thrust transmitting member having a central portion adapted to be secured to a shaft and a flange extending radially outward from said central portion, a thrust receiving member comprising a stiff outer substantially cylindrical supporting portion and a flange extending radially inward from said supporting portion, the two said flanges being arranged to face one another, a plurality of separate race members with flat race surfaces seated in concentric annular grooves in each of said flanges so as to face one another in pairs, one of each pair in one flange and the other of each pair in the opposed flange, a series of cylindrical thrust rollers with radially disposed axes located between each pair of race members, roller cage means comprising a plurality of separate, concentric, relatively rotatable ring-like parts each having mounted therein the rollers of one of said series, and means maintaining said cage means concentric with said thrust transmitting and receiving members.

2. A roller thrust bearing as claimed in claim 1, said cage means being supported by a series of rollers having their axes substantially parallel with the axis of the bearing and disposed so as to locate said ring-like parts in concentric relation to the axis of the bearing.

3. A roller thrust bearing as defined in claim 1, said ring-like parts each being made up of a plurality of arcuate sections.

4. A roller thrust bearing as defined in claim 1, at least one of said series of rollers comprising a plurality of groups of rollers, the rollers of each group having radial dimensions less than the radial width of the associated race members and being coaxially arranged, and the radial dimensions of the rollers in adjacent groups being different so that the junctions between the coaxial rollers of adjacent groups are staggered in relation to one another.

CHARLES ANTONY ABLETT.

REFERENCES CITED

The following references are of record in the file of this patent:

UNITED STATES PATENTS

| Number | Name | Date |
| --- | --- | --- |
| 431,690 | Gaffield | July 8, 1890 |
| 449,952 | Simonds | Apr. 7, 1891 |
| 2,117,633 | Smith | May 17, 1935 |
| 2,374,820 | Kaye | May 1, 1945 |